No. 695,399. Patented Mar. 11, 1902.
I. P. KINSEY.
APPARATUS FOR PURIFYING WATER.
(Application filed Jan. 4, 1902.)
(No Model.)
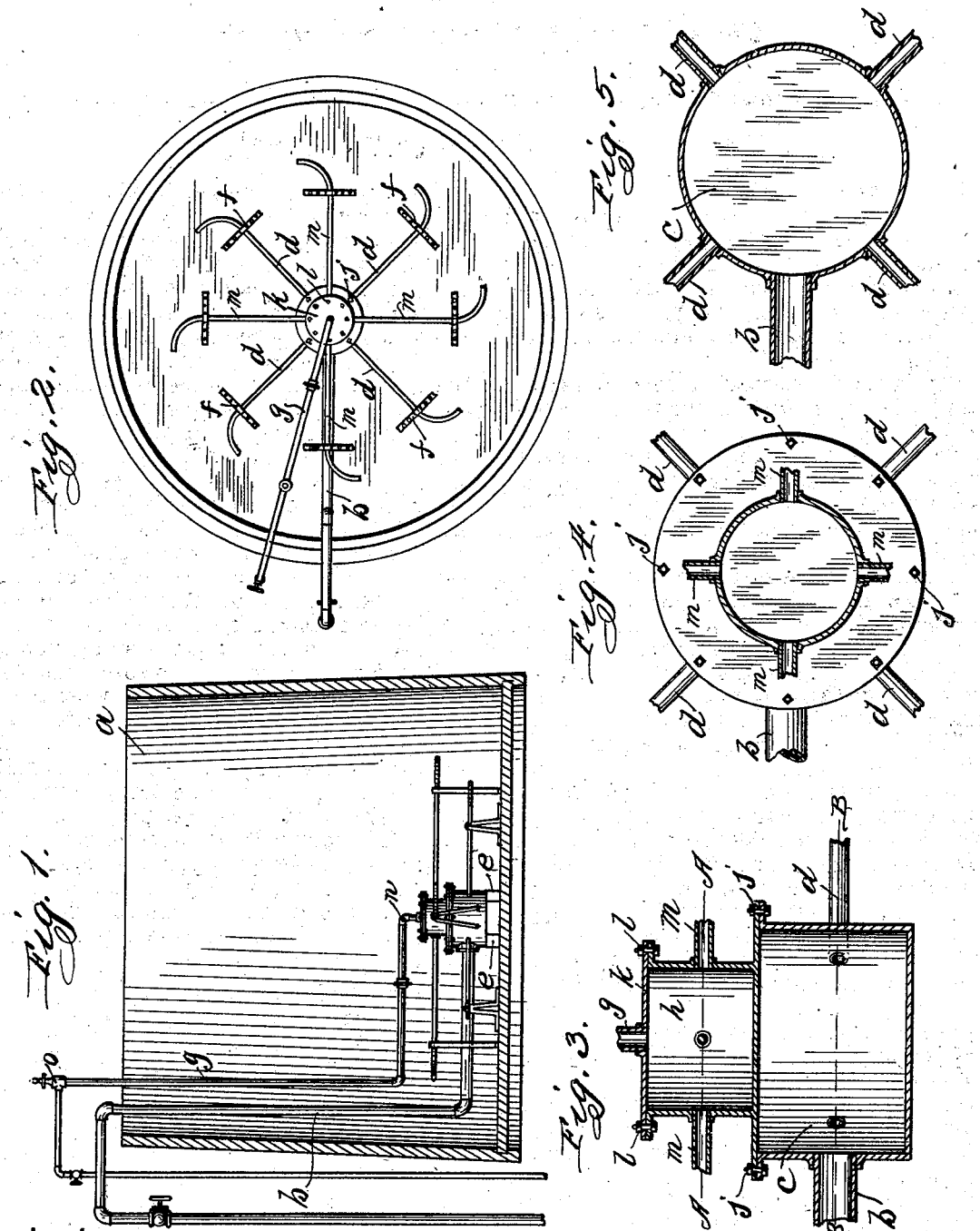

UNITED STATES PATENT OFFICE.

ISAAC P. KINSEY, OF CHICAGO, ILLINOIS.

APPARATUS FOR PURIFYING WATER.

SPECIFICATION forming part of Letters Patent No. 695,399, dated March 11, 1902.

Application filed January 4, 1902. Serial No. 88,412. (No model.)

*To all whom it may concern:*

Be it known that I, ISAAC P. KINSEY, a citizen of the United States, residing at Chicago, in the county of Cook and State of Illinois, have invented certain new and useful Improvements in Water-Purifying Systems and Apparatus, of which the following is a specification.

My invention relates to a novel system and apparatus for softening, purifying, and aerating water.

To illustrate one form of my invention, I annex hereto a sheet of drawings, in which the same reference characters are used to designate identical parts in all the figures, of which—

Figure 1 is a central section through a tank in which my apparatus is placed, the apparatus itself being shown in side elevation. Fig. 2 is a plan view of the same. Fig. 3 is a central vertical section through the apparatus with the discharge-arms broken off. Fig. 4 is a horizontal section on the line A A of Fig. 3, and Fig. 5 is a horizontal section on the line B B of Fig. 3.

My apparatus is conveniently employed in connection with one or more tanks $a$, into which a valve-controlled water-supply pipe $b$ leads and opens into the water-receiving chamber $c$, which preferably takes the form of a cup-like cylinder, into which the supply-pipe $b$ opens at one side and from which a plurality of discharge-pipes $d$, preferably equidistantly arranged, radiate and have their discharging ends curved and directed substantially tangentially to the sides of the tank, so that the water discharged therefrom tends to form a rotating body around the outer portion of the tank. The water-receiving chamber is preferably placed some little distance above the bottom of the tank upon the supports $e$, so that there will be some room for the sediment to collect beneath the discharge-pipes $d$, which have their outer ends preferably supported upon suitable blocks $f$.

The air-supply is conveyed through a supply-pipe $g$ to the air-receiving chamber $h$, which is similar to the water-receiving chamber $c$, except that it is on a smaller scale and is preferably concentric therewith and located on the top thereof, its base being conveniently enlarged, so as to extend over the top of the cylinder forming the chamber $c$, so that it can be bolted thereto, as at $j$, so as to form a water-tight receptacle. The air-supply pipe $g$ opens into the chamber $h$ at the top thereof, being let into the plate $k$, which forms said top and which is conveniently bolted onto the cylindrical body portion, at $l$, so as to form an air-tight chamber. A plurality of air-discharge pipes $n$, similar to the water-discharge pipes $d$, are let into the sides of the chamber $h$ and are preferably arranged equidistantly of each other and half-way between the water-discharge pipes $d$ and likewise have their ends curved and pointing tangentially, so that the air is discharged between and somewhat above the jets of water, so that it is in position to be thoroughly mixed with the water while it is being discharged. In addition to the air discharged from the ends of the pipes $m$, which cover the sides of the tank, I preferably employ another discharge from an aperture $n$, made in the joint of the air-supply pipe $g$, which tends to permit a portion of the air to ascend through the center of the tank. The supply of air under pressure may be furnished from any suitable source, such as an injector $o$, secured at any suitable point in the air-supply pipe. The tank will be supplied with the customary overflow-valves, discharge-supply valves, and the necessary openings through which the accumulated deposit may be removed, the illustration being intended to show only the novel features of my invention.

The operation of the system is as follows: The valve controlling the water-supply is open and the water is allowed to flow through the chamber $c$ and out of the discharge-pipes $d$ until the water rises above the air-discharge pipes $m$. The chemicals which may be used for softening the water and precipitating organic matter may be admitted into the tank at any time after the supply of water is started. After the discharge-pipes are covered the valve controlling the air under pressure is opened, and it is forced out of the nozzles of the pipe $m$, so that the air rushing into the moving water causes a violent and thorough admixture of the air and water in the tank, which continues until the tank is completely filled, when the air and water are both shut off and the sediment is allowed to settle, after which the water is purified and ready for use.

The mixture of the air and water produced by my apparatus, as well as the mixing of the chemicals with the water, is most thorough and effective, and in practice with the simple apparatus herein employed I have been able to secure much more satisfactory results than have been possible with the more complicated apparatuses previously employed for this purpose.

While I have described my invention as applied to the purpose of aerating water, it will be apparent that it can be used with any other materials where it is desired to secure an intimate and thorough impregnation of any liquid by any gaseous fluid.

While I have shown my invention as embodied in the form which I at present consider best adapted to carry out its purposes, it will be understood that it is capable of modifications and that I do not desire to be limited in the interpretation of the following claims except as may be necessitated by the state of the prior art.

What I claim as new, and desire to secure by Letters Patent of the United States, is—

1. In an apparatus of the class described, the combination with a tank, of a liquid-receiving chamber therein having a plurality of liquid-discharging apertures connected therewith, a pipe for connecting said chamber with a source of liquid-supply, a gas-receiving chamber having a corresponding plurality of gas-discharging apertures located adjacent to the liquid-discharging apertures, and a pipe for conveying into said gas-receiving chamber gas under pressure; substantially as and for the purpose described.

2. In an apparatus of the class described, the combination with a tank, of a liquid-receiving chamber therein having a plurality of discharge-pipes radiating therefrom and provided with discharge-apertures at their outer ends, a supply-pipe for connecting said chamber with a source of liquid-supply, a gas-receiving chamber located adjacent said liquid-receiving chamber and having a corresponding plurality of gas-discharging pipes radiating therefrom having discharge-apertures at their outer ends in the vicinity of the liquid-discharging apertures, and a gas-supply pipe for conveying into said gas-receiving chamber gas under pressure; substantially as and for the purpose described.

3. In an apparatus of the class described, the combination with a tank, of a liquid-receiving chamber therein having a plurality of liquid-discharge pipes radiating therefrom and having their outer ends curved so as to direct the discharge therefrom tangentially, a supply-pipe for connecting said liquid-receiving chamber with a source of liquid-supply, a gas-receiving chamber located adjacent said liquid-receiving chamber and having a corresponding plurality of gas-discharging pipes radiating therefrom and having their outer ends curved so as to direct the discharge therefrom tangentially and into the line of discharge of the liquid-discharging pipes, and a pipe for conveying into said gas-receiving chamber gas under pressure; substantially as and for the purpose described.

4. In an apparatus of the class described, the combination with a tank, of a liquid-receiving chamber therein consisting of a hollow cylinder having a plurality of liquid-discharging pipes radiating from the sides thereof with their ends curved so as to direct the liquid discharge therefrom tangentially, a supply-pipe for connecting such chamber with a source of liquid-supply, a gas-receiving chamber consisting of a hollow cylinder having its bottom bolted to the top of the liquid-receiving chamber and provided with a plurality of gas-discharging pipes radiating from its sides alternately with the liquid-discharging pipes and having their ends curved so as to direct the gas-discharge tangentially into the line of discharge of the liquid, and a supply-pipe for conveying into said gas-receiving chamber gas under pressure and opening into the top of said gas-receiving chamber; substantially as and for the purpose described.

In testimony whereof I affix my signature in presence of two witnesses.

ISAAC P. KINSEY.

Witnesses:
JOHN H. McELROY,
HATTIE O. HALVORSON.